US012017376B2

(12) United States Patent
Maddalon

(10) Patent No.: US 12,017,376 B2
(45) Date of Patent: Jun. 25, 2024

(54) PROCESS FOR PRODUCING A PRINTED SUPPORT AND RELATED PRINTING SYSTEM

(71) Applicant: FOTOBA INTERNATIONAL S.R.L., Quaregna (IT)

(72) Inventor: Valter Maddalon, Pralungo (IT)

(73) Assignee: FOTOBA INTERNATIONAL S.R.L., Quaregna (IT)

( * ) Notice: Subject to any disclaimer, the term of this patent is extended or adjusted under 35 U.S.C. 154(b) by 350 days.

(21) Appl. No.: 17/627,645

(22) PCT Filed: Jul. 14, 2020

(86) PCT No.: PCT/IB2020/056620
§ 371 (c)(1),
(2) Date: Jan. 15, 2022

(87) PCT Pub. No.: WO2021/009680
PCT Pub. Date: Jan. 21, 2021

(65) Prior Publication Data

US 2022/0258370 A1 Aug. 18, 2022

(30) Foreign Application Priority Data

Jul. 16, 2019 (IT) ........................ 102019000011847

(51) Int. Cl.
*B26D 5/00* (2006.01)
*B26F 1/38* (2006.01)
*B41J 11/66* (2006.01)

(52) U.S. Cl.
CPC ............ *B26D 5/007* (2013.01); *B26F 1/3806* (2013.01); *B41J 11/663* (2013.01)

(58) Field of Classification Search
CPC .......... B26D 5/007; B26D 5/32; B26D 11/00; B26D 7/18; B26D 5/34; B26D 1/245; B26D 1/105; B41J 11/663; B41J 3/01; B26F 1/3806; G03D 15/046; G06F 3/1218; Y10T 83/4473; Y10T 83/178; Y10T 83/543; Y10T 83/6598; Y10T 83/2085
USPC ...... 83/13, 27, 44, 45, 47, 71, 80, 106, 209, 83/210, 211, 212, 213, 214, 255, 302,
(Continued)

(56) References Cited

U.S. PATENT DOCUMENTS 4,506,824 A 3/1985 Bartz et al.
4,784,318 A 11/1988 Bay et al.
(Continued)

FOREIGN PATENT DOCUMENTS

EP 0947880 A1 10/1999
WO WO 2017122067 A1 7/2017

OTHER PUBLICATIONS

International Search Report dated Nov. 27, 2020 for International Application No. PCT/IB2020/056620.

*Primary Examiner* — Ghassem Alie
(74) *Attorney, Agent, or Firm* — Sterne, Kessler, Goldstein & Fox P.L.L.C.

(57) ABSTRACT

The present disclosure provides a process for manufacturing a printed support (S), which can be cut by any automatic cutter capable of reading an optical code (OC), which does not require updating the resident software of the microprocessor unit that controls the printer (or printers). A printing system of a printable support which implements the process is also disclosed.

5 Claims, 1 Drawing Sheet

(58) Field of Classification Search
USPC .... 83/371, 408, 430, 481; 234/2, 38, 25–29, 234/40–50, 63, 64; 355/28, 29
See application file for complete search history.

(56) References Cited

U.S. PATENT DOCUMENTS

| | | | | | |
|---|---|---|---|---|---|
| 5,159,385 | A * | 10/1992 | Imamura | G03B 27/32 | 355/28 |
| 6,283,647 | B1 * | 9/2001 | Konishi | G06K 19/06028 | 400/70 |
| 2003/0033918 | A1 * | 2/2003 | Maddalon | B26D 5/32 | 83/365 |
| 2005/0102053 | A1 * | 5/2005 | Newman | G03B 27/521 | 700/125 |
| 2014/0116215 | A1 * | 5/2014 | Kwarta | B26F 1/20 | 83/76.1 |
| 2016/0046033 | A1 * | 2/2016 | Zuech | B65H 23/046 | 700/127 |
| 2018/0063366 | A1 * | 3/2018 | Mori | H04N 1/00424 | |
| 2019/0114121 | A1 * | 4/2019 | Nakanishi | G06K 15/1856 | |
| 2020/0034587 | A1 * | 1/2020 | Isobe | G06F 3/1234 | |

* cited by examiner

PROCESS FOR PRODUCING A PRINTED SUPPORT AND RELATED PRINTING SYSTEM

TECHNICAL FIELD

The present disclosure relates in general to the cutting of substrates on which a plurality of pictures are printed, such as in particular photographic paper, fabric, PVC and similar ribbons in foil or rolled up. More specifically, this disclosure relates to a process for manufacturing a printed support with at least one picture and a respective optical code, as well as a relative printing system for implementing this process.

BACKGROUND

It is known that the graphic and photographic technique, including that of digital restitution, is undergoing a profound transformation and development, moving increasingly towards ink jet printing technology from digital "files" on sheets or rolls of substrates having different characteristics and sizes, with pictures of different sizes. The individual pictures are obtained by cutting processes in which either sheets or rolls are introduced into cutting devices comprising cutting units configured to make cuts in a longitudinal direction parallel to the feeding direction and also in a transverse direction perpendicular to the feeding direction.

Automatic cutting devices are known comprising one or more longitudinal cutting units adapted to allow cutting of a substrate in a feeding direction and at least a transversal cutting unit adapted to allow cutting of a substrate perpendicular to the feeding direction. The transversal cutting unit is typically movable along a first transversal guide, while the longitudinal cutting units are typically tied to a second transversal guide along which they are blocked in predetermined positions corresponding to the longitudinal edges of the pictures printed on the substrate.

These cutting devices can be equipped with automatic correction means for correcting the alignment errors between the longitudinal and transversal cutting units and special reference marks printed along the longitudinal and transverse edges of the pictures to be cut. The correction means comprise optical units, such as for example reflective optical cells, and the reference marks consist, for example, of one or more black bands parallel to the edges of the pictures. A cutting device of this type is described in the Italian patent 102005901315597 in the name of the applicant.

Methods are also known for cutting substrates bearing printed pictures according to which, in addition to the pictures to be cut on a substrate, optical codes are also printed containing data relating to these pictures, such as in particular their number, their dimensions and the their position with respect to the margins of the substrate. Optical codes can be for example bar codes.

Cutting devices configured for the implementation of these cutting methods comprise respectively one or more optical readers configured for the acquisition of the codes and a control unit configured for the processing of the acquired data and the selective control of the transversal and longitudinal cutting units on the basis of these data.

U.S. Pat. Nos. 4,506,824 and 4,784,318 describe automatic cutting devices in which the longitudinal and transversal cutting units, arranged according to fixed schemes, corresponding for example to the standard formats of the sheets of paper, are selectively implemented on the basis of the size and position information deriving from the codes printed on a substrate.

EP 947880 describes an automatic cutting device similar to the previous ones, but in which the longitudinal cutting units are individually motorized and can be positioned individually and independently from each other along the respective transverse guide. This configuration allows an automatic cutting device to be adapted to a specific set of pictures printed on a substrate, that is, to their particular dimensions, number and arrangement with respect to the margins of the substrate. The optical codes can be combined with single pictures, or with sets of pictures, and precede these pictures in the feeding direction to allow the arrangement of the cutting units before their passage. The optical codes can also be printed after each picture or in sets of pictures to allow for any corrections of the position of the transverse cuts necessary to compensate for the position variations of the pictures caused by thermal expansion of the substrate in the longitudinal direction during its processing.

FIG. 1 shows an optical code OC printed on a support S which contains multiple pictures S1 and S2, as well as reference marks RM printed on the substrate S along the longitudinal and transverse edges of the pictures S1 and S2 to be cut out. Typically, an automatic cutter is equipped with reflective optical cells 125 configured to detect RM reference marks in the form of one or more black bands parallel to the edges of the pictures S1, S2, etc. These optical cells 125 are advantageously associated with optical readers 123 configured to read these optical OC codes. Optical codes OC typically contain data about the arrangement of the pictures S1, S2, etc., with respect to the edges of the substrate S, so that based on these data the positions of the longitudinal and transversal cutting units of the automatic cutter can be determined, which are controlled accordingly. While it is convenient to use optical codes with information to guide the cutting operations of each picture printed on a continuous support, this technique currently requires frequent updates of the printer software to produce a printed support that can be precisely cut from an automatic cutter.

SUMMARY

In order to overcome these limitations, the present disclosure provides a process for producing a printed support, which can be cut by any automatic cutter capable of reading an optical code, which does not require updating the resident software of the microprocessor unit which commands the printer (or printers).

According to an aspect of the method of this disclosure, in the microprocessor unit a resident software is installed for managing picture, to be printed on a printable support, wherein the resident software generates information on the boundaries of each picture to be cut and which generates a corresponding string of queries for each picture on the support. The microprocessor unit connects over the network to a URL (Uniform Resource Locator) comprising at least one host address of a remote server and the query string. Thanks to a remote program installed on the server, the server processes the query string, generates a file of a corresponding optical code which contains information about the borders of the picture to be cut in a format understandable to an automatic cutter, then sends a file of such an optical code to a microprocessor unit that controls the printing of the optical code on the substrate in a position such as to be read by the automatic cutter. This process may be implemented via a printing system for printing a printable medium, the system comprising the following equipment:

at least one printer, configured to print pictures and optical codes on the support;

a microprocessor unit having a resident software, configured to command the printer to print at least one picture and a related optical code;

a remote server configured to generate optical code picture files;

wherein the resident software is configured to generate, when executed, coordinates of borders to be cut of at least one picture on the support and to perform the following operations for each picture to be cut, printed on the support:

generating a corresponding query string representative of coordinates of cuts, with respect to a reference position of an automatic cutter, that the automatic cutter must perform to cut out the picture, connecting the microprocessor unit in the network to a URL (Uniform Resource Locator) comprising at least one host address of the remote server and said query string, printing an optical code on the substrate in a position that may be read by the automatic cutter and in correspondence with the picture to be cut;

and wherein said remote server is configured to perform the following operations:

generating a file of an optical code corresponding to said query string, the optical code by encoding information about the coordinates of cuts in a format readable by the automatic cutter, transmitting the optical code file from the remote server to the printer.

DETAILED DESCRIPTION

Figures 1, 2:
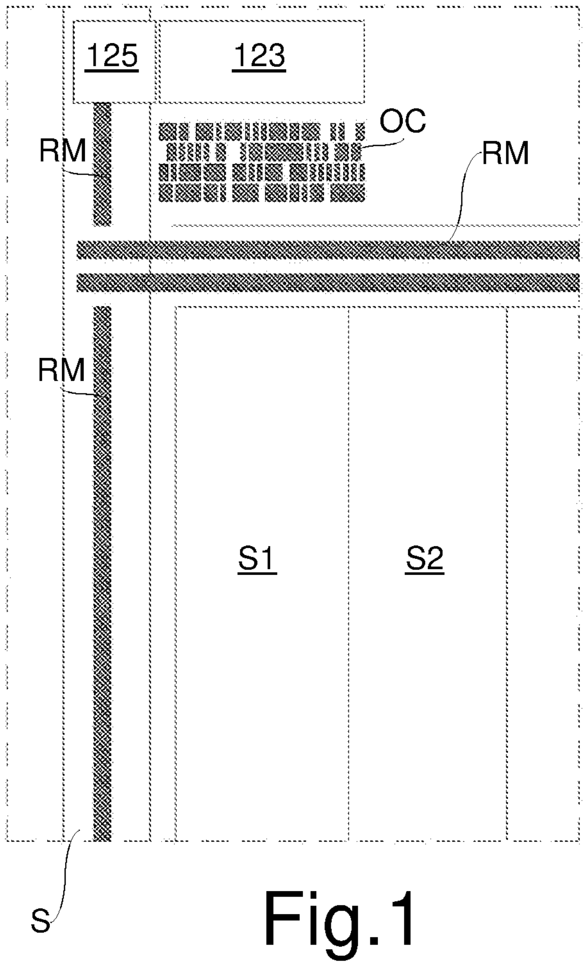
FIG. 1 is a top plan view of a portion of a substrate bearing printed pictures, on which there is an example of an optical code for setting the position of the cutting units of an automatic cutter.
FIG. 2 is an example of a picture of a bar code which can be automatically generated by a server and printed on the support according to the method of this disclosure.

The software currently used to run in the microprocessor unit which controls the printing of a printed medium, are generally complex and expensive and are not updated frequently. Sometimes it happens that an updated feature of a cutter, with better performances or with other improvements, cannot be exploited by any software of the microprocessor units that manage printers.

Moreover, there is a tendency to produce printed media with the arrangement of pictures desired by the customer, and this reduces even more the standardization of cutting operations, which instead must be configured for each task to be performed.

In order to avoid having to frequently update the software of the microprocessor unit that controls the printing of a printed support that contains one or more pictures and an optical code, functional for guiding the cutting devices of an automatic cutter, this disclosure provides a method in which the generation of the optical code is deferred to a remote server, preferably cloud-based. The printed support with at least one optical code associated with a picture is then produced by connecting to a remote server the unit running a resident printing software.

A relevant advantage of this procedure consists in the fact that the resident software of the microprocessor unit that controls the printing no longer has to deal with the generation of the optical code, because this operation is deferred to a simple computer program that runs on the server. As a consequence, it is no longer necessary to update the resident software to support all the most recent automatic cutters placed on the market and/or all possible formats in which the user can decide to print and/or all possible printable supports, but it is sufficient to update the simple program that runs on the remote server. The advantage is even more felt in widespread systems comprising multiple printers connected to a single or multiple microprocessor units on which the resident software is installed. Simultaneously updating the software of many microprocessor units to support a new type of automatic cutter or to carry out a particular sequence of cuts would be particularly expensive and it is unlikely that it can be performed with the necessary frequency.

According to the process of this disclosure, once the residing software in the microprocessor unit that controls the printers has identified the coordinates of the borders of a picture to be cut, this resident software generates a corresponding query string representative of the coordinates of cuts that an automatic cutter must carry out to cut out the picture. The coordinates of the cuts are typically defined with respect to a reference position of an automatic cutter, such as for example the position of an edge of a longitudinal reference mark printed on the printed support. The query string is thus the element that must be transmitted to the server and which encodes the information on the cuts to be made.

Conveniently the query string will be an alphanumeric string of ASCII characters, for example of the type:

Cut1=100&Cut2=1832&Cut3=3555 to indicate the coordinates of three longitudinal cuts to be made, for example with respect to the right side of the longitudinal reference mark of the printed support. In one aspect, the query string can conveniently have such a structure Cut1=x1&Cut2=x2&Cut3=x3& . . .

in which $x1<x2<x3$ . . .

are the coordinates of the cuts to be made, indicated in order starting from the reference position of the cutter.

The microprocessor unit running the resident print software will connect to a remote server with a Uniform Resource Locator (URL) including at least one host address of the remote server and the query string ("querystring"), for example of the type:

protocol://host/querystring where "protocol" indicates the protocol to be used for accessing the server (for example HTTP, HTTPS etc.).

Optionally, the URL may also contain an indication of a path ("path"):

protocol://host/path?querystring on the server to identify a specific page for a type of cutter (and/or for a particular customer, and/or also for a particular type of printed support) to be accessed with the "querystring" query string in order to generate the optical code for that particular type of cutter (and/or for the particular customer/support).

In response to this access, the remote server will generate a corresponding file of an optical code, for example of the type shown in FIG. 2, which corresponds to the sent query string and which encodes information, in a format readable by the automatic cutter, on the coordinates of the cuts to be made.

According to one aspect, the format may vary according to the cutter model and/or the type of support, for example cardboard, paper or fabric.

The optical code is then transmitted to the unit running the resident software, which commands a printer that prints it on the support in correspondence with the picture to be cut out.

Thanks to the process of this disclosure, it is easier to update the rules according to which optical codes are generated without having to update the resident software executed by the microprocessor unit that controls the printer. It is also possible to generate different barcodes for different automatic cutters, even if the automatic cutters that will have to cut the pictures from the support were more recent than the resident software.

Furthermore, if it is required to customize the optical code to contain further information of specific customers, with the procedure of this disclosure this can be easily done by reconfiguring the remote server only, without having to update the resident software.

The invention claimed is:

1. A process for producing a printed support with at least one image and a respective optical code, wherein said image can be cut out from said printed support with an automatic cutter capable of reading said optical code, comprising:

providing and installing at least one printer, configured to print images and optical codes on said support;

providing and installing a microprocessor unit having a resident software, configured to command the printer to print at least one image and a corresponding optical code;

providing and installing a remote server configured to generate image files of optical codes;

generating, by said resident software, coordinates of bounds to be cut of said at least one image on said support;

for each image to be cut out printed on the support, carrying out the following operations:

generating a corresponding query string that represents at least coordinates of cuts, with respect to a reference position of an automatic cutter, which the automatic cutter must carry out for cutting out said image, connecting said microprocessor unit in a network to a Uniform Resource Locator (URL) comprising at least one host address of a remote server and said query string, generating a file of an optical code corresponding to said query string, said optical code encoding information on the coordinates of cuts in a format that can be read by said automatic cutter, transmitting said optical code file from said remote server to said microprocessor unit, printing with said printer said optical code on the substrate in a position readable by the automatic cutter and in correspondence with said image to be cut out.

2. The process according to claim 1, wherein said reference position identifies a position of a side sensor of the automatic cutter with respect to an edge of a longitudinal reference mark printed on said printed support.

3. The process according to claim 1, wherein said query string is a string of ASCII characters.

4. The process according to claim 1, wherein said query string also represents information on a material of which said printed support is made.

5. A printing system for producing a printed support with at least one image and a respective optical code, wherein said image can be cut out from said printed support with an automatic cutter capable of reading said optical code, said printing system comprising the following equipment:

at least one printer, configured to print images and optical codes on said support;

a microprocessor unit having a resident software, configured to command the printer to print at least one image and a corresponding optical code;

a remote server configured to generate image files of optical codes;

wherein said resident software is configured to generate, when executed, coordinates of bounds to be cut of said at least one image on said support and to perform the following operations for each image to be cut printed on the support:

generating a corresponding query string representative of coordinates of cuts, with respect to a reference position of an automatic cutter, which the automatic cutter must carry out for cutting out said image, connecting said microprocessor unit in a network to a Uniform Resource Locator (URL) comprising at least one host address of the remote server and said query string, printing an optical code on the substrate in a position readable by the automatic cutter and in correspondence with said image to be cut;

and wherein said remote server is configured to perform the following operations:

generating a file of an optical code corresponding to said query string, said optical code encoding information on the coordinates of cuts in a format that can be read by said automatic cutter, transmitting said file of the optical code from said remote server to said microprocessor unit.

* * * * *